US012246937B2

(12) United States Patent
Tachibana

(10) Patent No.: US 12,246,937 B2
(45) Date of Patent: Mar. 11, 2025

(54) SHEET STORAGE UNIT

(71) Applicant: Glory Ltd., Himeji (JP)

(72) Inventor: Yusaku Tachibana, Hyogo (JP)

(73) Assignee: GLORY LTD., Himeji (JP)

( * ) Notice: Subject to any disclaimer, the term of this patent is extended or adjusted under 35 U.S.C. 154(b) by 349 days.

(21) Appl. No.: 17/696,896

(22) Filed: Mar. 17, 2022

(65) Prior Publication Data

US 2022/0204300 A1 Jun. 30, 2022

Related U.S. Application Data

(63) Continuation of application No. PCT/JP2020/035099, filed on Sep. 16, 2020.

(30) Foreign Application Priority Data

Sep. 20, 2019 (JP) ................................. 2019-171934

(51) Int. Cl.

*B65H 29/00* (2006.01)
*B65H 43/00* (2006.01)
*G07D 11/13* (2019.01)

(52) U.S. Cl.

CPC ........... *B65H 29/006* (2013.01); *B65H 43/00* (2013.01); *G07D 11/13* (2019.01); *B65H 2404/255* (2013.01); *B65H 2701/1912* (2013.01); *G07D 2211/00* (2013.01)

(58) Field of Classification Search

CPC .......... B65H 29/006; B65H 2701/1912; B65H 2301/4191; B65H 2301/41912; G07D 11/12; G07D 11/13

See application file for complete search history.

(56) References Cited

U.S. PATENT DOCUMENTS 6,164,585 A * 12/2000 Lutz ....................... G07D 11/12 242/534
6,715,753 B1 4/2004 Conca et al.
7,780,111 B2 * 8/2010 Elbel ........................ B65H 5/28 242/420.2
8,157,078 B1 4/2012 Folk et al.

(Continued)

FOREIGN PATENT DOCUMENTS

JP 59-108630 A 6/1984
JP 2000-348235 A 12/2000

(Continued)

OTHER PUBLICATIONS

International Search Report and Written Opinion mailed on Nov. 10, 2020, received for PCT Application PCT/JP2020/035099, Filed on Sep. 16, 2020, 9 pages including English Translation.

(Continued)

*Primary Examiner* — Sang K Kim
(74) *Attorney, Agent, or Firm* — XSENSUS LLP

(57) ABSTRACT

A sheet storage that stores a sheet includes: a reel around which a tape is wound; a first drive unit that rotates the reel around a rotation axis; a drum that is connected to the reel via the tape and winds the tape wound around the reel together with the sheet; a second drive unit that rotates the drum around a rotation axis; and a control circuitry that controls at least one of the first drive unit and/or the second drive unit to change tension acting on the tape according to a state of the sheet storage.

14 Claims, 8 Drawing Sheets

(56) References Cited

U.S. PATENT DOCUMENTS

| | | | | |
|---|---|---|---|---|
| 9,342,944 | B2 * | 5/2016 | Amo .................... | B65H 29/006 |
| 2004/0173708 | A1 | 9/2004 | Neumann et al. | |
| 2012/0305362 | A1 | 12/2012 | Iwamura et al. | |
| 2019/0073853 | A1 * | 3/2019 | Shimamura .......... | B65H 29/006 |

FOREIGN PATENT DOCUMENTS

| | | | |
|---|---|---|---|
| JP | 2013-133211 | A | 7/2013 |
| JP | 2016-3095 | A | 1/2016 |
| WO | 2010/032303 | A1 | 3/2010 |
| WO | 2016/140139 | A1 | 9/2016 |

OTHER PUBLICATIONS

Extended European search report issued on Oct. 21, 2022, in corresponding European patent Application No. 20865351.9, 9 pages.

* cited by examiner

| | | Tension setting level | | | | | | | | | Purpose/Effect |
|---|---|---|---|---|---|---|---|---|---|---|---|
| | | -20% | -15% | -10% | -5% | Normal | +5% | +10% | +15% | +20% | |
| [1] | State of the number of stored sheets | X2 or more | | X1 or more and less than X2 | | 0 or more and less than X1 | | | | | The tension naturally increases when many sheets are stored as the diameter of a reel decreases.<br>The tension of the plurality of sheets is thus decreased to reduce unnecessary energy consumption. |
| [2] | State during operation of tape (acceleration, constant velocity, or deceleration) | | Tape is easily slackened or stretched (acceleration or deceleration of tape) | | | Constant velocity | | Tape is easily slackened or stretched (acceleration or deceleration of tape) | | | The tension of the tapes is adjusted so as to prevent the tapes from getting easily slackened or stretched when the tapes accelerate or decelerate. |
| [3] | Type of wound sheet | | | | | Normal note | Other than normal note (hybrid sheet and stiff sheet) | | | | When sheets with inconsistent thickness or stiff sheets are stored, the shape of a drum tends to become a truncated cone as more sheets are stored.<br>To prevent the situation, the sheets are stored with high tension. |
| [4] | Direction of wound sheet | | | | | Less than Y1 sheets in the same direction | Y1 or more and less than Y2 sheets in the same direction | Y2 or more sheets in the same direction | | | When sheets in the above [3] are stored in the same direction, the shape of a drum tends to become a truncated cone as more sheets are stored.<br>To prevent such deterioration of the storage condition, the sheets are stored with high tension. |
| [5] | The number of simultaneously operating units | | | | Z1 or more | Less than Z1 | | | | | Less than Z1 units can operate within the maximum output power of a power supply.<br>When it is determined after sheet recognition in a recognition unit that Z1 units operate at the same time, power consumption is reduced by temporarily lowering the tension to prevent the power supply from going down. |
| [6] | Real time unit power consumption | | V3% or more of normal rated power | V2% or more and less than V3% of normal rated power | V1% or more and less than V2% of normal rated power | Less than V1% of normal rated power | | | | | The total power consumption of the entire apparatus is figured out by monitoring current values used to drive a unit.<br>When the margin is reduced relative to the normal rated power, power consumption is temporarily reduced by lowering the tension to prevent the power supply from going down. |

FIG. 5

SHEET STORAGE UNIT

CROSS-REFERENCE TO RELATED APPLICATIONS

This application is a bypass continuation of International Patent Cooperation Treaty Application No. PCT/JP2020/035099, filed on Sep. 16, 2020, which claims priority to Japanese Patent Application No. 2019-171934, filed on Sep. 20, 2019, the entire disclosures of each are incorporated herein by reference.

BACKGROUND ART

There is known a banknote storing and ejecting apparatus that stores banknotes by winding the banknotes around a wheel together with a tape, for example. The banknote storing and ejecting apparatus can maintain a constant tension of the tape.

SUMMARY

A sheet storage according to the present disclosure is a sheet storage storing a sheet, and comprises: a reel around which a tape is wound; a first drive unit that rotates the reel around a rotation axis; a drum that is connected to the reel via the tape and winds the tape wound around the reel together with the sheet; a second drive unit that rotates the drum around a rotation axis; and a control circuitry that controls at least one of the first drive unit and/or the second drive unit to change tension acting on the tape according to a state of the sheet storage.

BRIEF DESCRIPTION OF DRAWINGS

FIG. 5 is a chart for describing tension control for tapes;

DESCRIPTION OF EMBODIMENTS

Further improvement in performance is required for a sheet storage that stores sheets by winding the sheets together with a tape.

With this regard, it is an object of the present disclosure to provide a technique for improving performance of a sheet storage.

According to the present disclosure, it is possible to improve performance of a sheet storage.

Hereinafter, embodiments of the present disclosure will be described with reference to the accompanying drawings.

Figure 1:
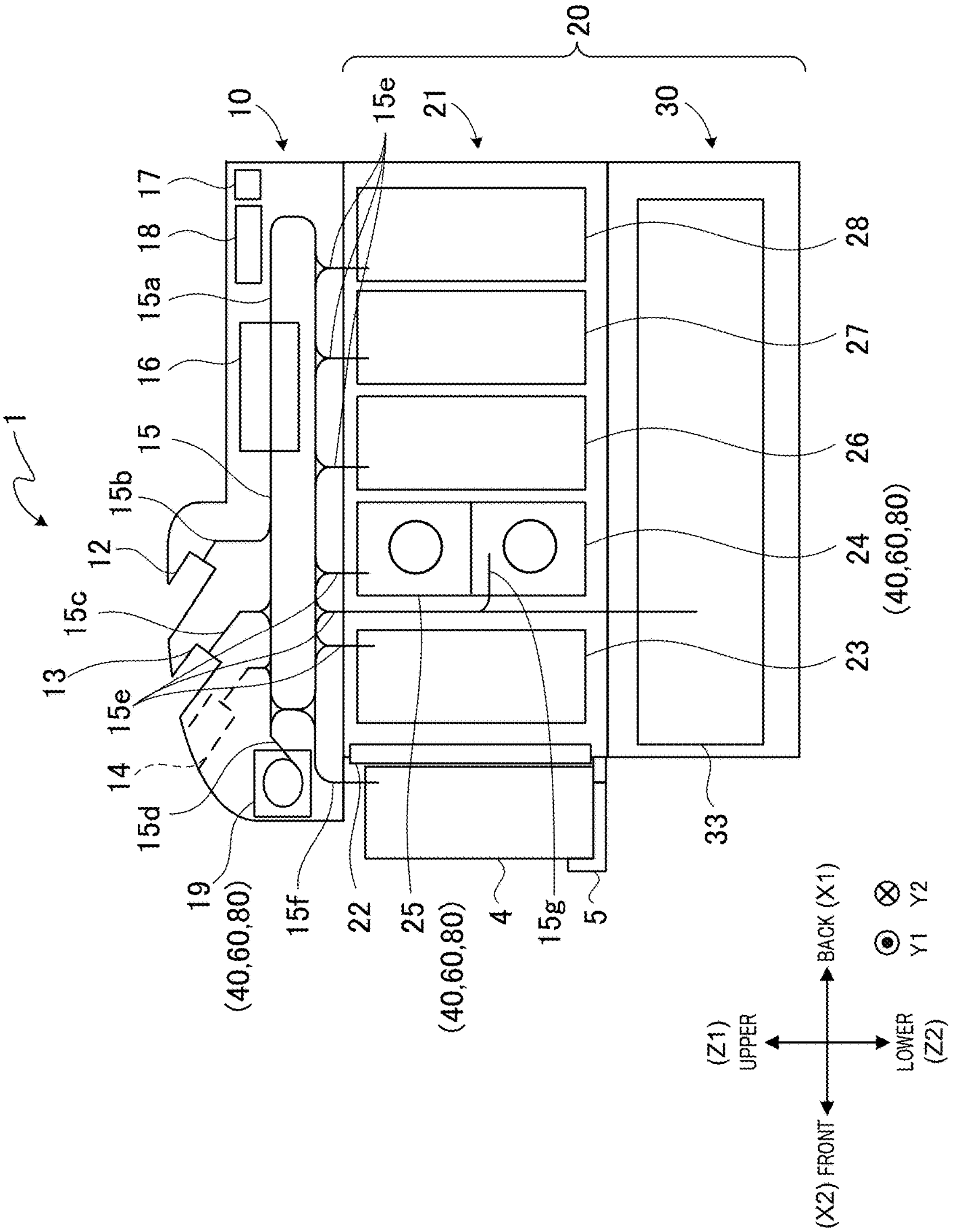
FIG. 1 illustrates a sheet processing apparatus comprising a sheet storage according to Embodiment 1.

FIG. 1 illustrates a sheet processing apparatus 1 comprising a sheet storage according to Embodiment 1. In the example illustrated in FIG. 1, the sheet processing apparatus 1 is a sheet depositing and dispensing machine for depositing and dispensing sheets.

Note that the sheets are not limited to banknotes, and may include vouchers, securities, and ballots, for example. In this specification, as illustrated in FIG. 1, descriptions will be given using directions defined as follows when necessary. The direction X2 indicates a side where an inlet is provided in the sheet processing apparatus 1, and the direction X1 indicates a side opposite to the side where the inlet is provided in the sheet processing apparatus 1. The direction Y1 indicates one side of the extending direction of a rotation axis of a drum of the sheet storage, and the direction Y2 indicates the other side of the extending direction of the rotation axis of the drum of the sheet storage. The direction Z1 indicates a direction opposite to the direction of gravity, and the direction Z2 indicates the direction of gravity. Note that, in normal use of the sheet processing apparatus 1, an upper direction and a lower direction of the sheet processing apparatus 1 are the direction Z1 and the direction Z2 respectively, and a front direction and a back direction of the sheet processing apparatus 1 are the direction X2 and the direction X1 respectively. Such directions are used in the following description.

The sheet processing apparatus 1 comprises an upper housing 10 and a lower housing 20.

The upper housing 10 comprises an inlet 12 where a sheet to be deposited is placed, and an outlet 13 where a withdrawn sheet is placed. The upper housing 10 also comprises a transport unit 15, which transports sheets, a recognition unit 16, which recognizes the sheets, a control circuitry 18, which controls each part of the sheet processing apparatus 1, and a temporary storage unit 19, which temporarily stores the sheets. As necessary, a second outlet 14 may be provided next to the outlet 13. The configuration of the second outlet 14 may be the same as or different from that of the outlet 13.

The inlet 12 is configured to feed sheets one by one to the transport unit 15. The outlet 13 is configured to stack sheets fed out to the outlet 13.

The transport unit 15 is a transport device that transports sheets at a predetermined transport velocity. The transport unit 15 may be configured by a belt mechanism or a roller mechanism that transports sheets. The transport unit 15 comprises a loop transport path 15*a*, which transports sheets in a loop, and divergent paths, which are a first divergent path 15*b*, a second divergent path 15*c*, a third divergent path 15*d*, a fourth divergent path 15*e*, and a fifth divergent path 15*f*, diverged from the loop transport path 15*a*.

The first to fifth divergent paths 15*b* to 15*f* respectively connect the loop transport path 15*a* and other units; the first divergent path 15*b* connects the inlet 12, the second divergent path 15*c* connects the outlet 13, the third divergent path 15*d* connects the temporary storage unit 19, the fourth divergent paths 15*e* connect a first storage 21 and a second storage 30 to be described later, and the fifth divergent path 15*f* connects a detachable storage unit 4 to be described later. A diverter (not illustrated) that diverts sheets is provided at a point of connection between each of the first to fifth divergent paths 15*b* to 15*f* and the loop transport path 15*a*. In a case where the second outlet 14 is provided, another divergent path is provided to connect the loop transport path 15*a* and the second outlet 14.

The recognition unit 16 is a recognition device that reads information of sheets and recognizes the sheets. The recognition unit 16 comprises sensors such as an image sensor, an optical sensor, and a magnetic sensor, and recognizes sheet information of sheets transported by the transport unit 15, such as authentication, denomination, fitness, and serial numbers.

The serial number is a unique number given to each sheet, and is composed of a 10-digit string of a combination of alphabet letters and numbers, for example. The recognition unit 16 recognizes each of the 10-digit letters and numbers composing the serial number.

The temporary storage unit 19 is a storage device that temporarily stores sheets. The temporary storage unit 19 can take sheets one by one to store, and feed out the stored sheets one by one.

The temporary storage unit 19 is configured by, for example, a winding-type storage unit in which a plurality of sheets are wound around a rotating body and stored. The temporary storage unit 19 may also be configured by a stacking-type storage unit in which a plurality of sheets are stacked and stored.

A memory 17 is, for example, a nonvolatile memory. The control circuitry (central processing unit (CPU)) 18 is configured to control operations of the sheet processing apparatus 1. The control circuitry 18 is configured to perform processing using information stored in the memory 17. The control circuitry 18 controls the transport unit 15 so that sheets are transported among the inlet 12, the outlet 13, the temporary storage unit 19, the first storage 21 and the second storage 30 to be described later, and the detachable storage unit 4 to be described later.

The lower housing 20 comprises the first storage 21, and the second storage 30 provided lower the first storage 21.

The first storage 21 is configured by, for example, a safe. The front side of the first storage 21 is provided with a lockable storage door 22.

The first storage 21 is provided with a first storage unit 23, a second storage unit 24 and a third storage unit 25 located upper the second storage unit 24, a fourth storage unit 26, a fifth storage unit 27, and a sixth storage unit 28, in order from the front. The fourth divergent path 15*e* extending from the loop transport path 15*a* to the second storage 30 is provided between the first storage unit 23 and adjacent storage units, which are the second storage unit 24 and the third storage unit 25.

The fourth divergent paths 15*e* diverged from the loop transport path 15*a* are respectively connected to the first storage unit 23, and the third to sixth storage units 25 to 28. In addition, the sixth divergent path 15*g* is diverged from the fourth divergent path 15*e* extending from the loop transport path 15*a* to the second storage 30, and is connected to the second storage unit 24.

The first to sixth storage units 23 to 28 are stacking-type storage units in which a plurality of sheets are stacked and stored. The first to sixth storage units 23 to 28 each store sheets classified according to the recognition results by the recognition unit 16.

The entrances to the first to sixth storage units 23 to 28 are each provided with a sensor (not illustrated) that detects passage of a sheet. The sensor is, for example, an optical sensor that comprises a light emitting unit that emits light such as infrared rays, and a light receiving unit that receives light from the light emitting unit. Note that the sensor may be any type of sensor as long as it is capable of detecting that a sheet is stored in each storage unit.

The second storage 30 is configured by, for example, a safe. Additionally, the second storage 30 comprises a collection unit 33 inside. The collection unit 33 has a storage area inside, and the storage area stores sheets to be collected among sheets deposited from the inlet 12 and sheets stored in the first storage 21. The collection unit 33 is connected to the fourth divergent path 15*e* diverged from the loop transport path 15*a*.

Note that the first storage 21 and the second storage 30 may be configured to be a single storage. In this case, the single storage can be internally divided into an area corresponding to the first storage 21 and an area corresponding to the second storage 30.

After the sheets to be collected are stored in the collection unit 33, the sheets are collected from the collection unit 33 by a collector. Alternatively, after the sheets to be collected are stored in the collection unit 33, the collection unit 33 is detached from the sheet processing apparatus 1 by a collector, and collected together with the sheets.

The lower housing 20 comprises an attaching unit 5 on the outer surface on the front side of the first storage 21 to attach the detachable storage unit 4. Note that the outer surface of the first storage 21 is a surface of the first storage 21 that is accessible without unlocking the locked storage door 22, which is the outer surface of the lower housing 20 or the outer surface of the storage door 22 more specifically.

The attaching unit 5 comprises a fixing member that fixes the detachable storage unit 4 attached to the attaching unit 5. The fixing member may comprise a lock device.

The attaching unit 5 comprises a terminal (not illustrated) for supplying a control signal from the control circuitry 18 to the detachable storage unit 4. The detachable storage unit 4 also comprises a terminal (not illustrated) to be connected to the terminal of the attaching unit 5.

After the detachable storage unit 4 is attached to the attaching unit 5, the terminal of the detachable storage unit 4 and the terminal of the attaching unit 5 are directly or indirectly connected to each other. In addition, after the detachable storage unit 4 is attached to the attaching unit 5, a storage area inside the detachable storage unit 4 is connected to the fifth divergent path 15*f*.

The detachable storage unit 4 is a stacking-type storage unit in which a plurality of sheets are stacked and stored. The detachable storage unit 4 may be a winding-type storage unit in which a plurality of sheets are wound around a rotating body and stored.

The detachable storage unit 4 comprises a drive mechanism (not illustrated) composed of, for example, a motor for storing sheets inside and feeding the sheets outside. In a case where the detachable storage unit 4 does not comprise the drive mechanism, the sheet processing apparatus 1 comprises the drive mechanism and transmits the driving force to the detachable storage unit 4 attached to the attaching unit 5.

Figure 2:
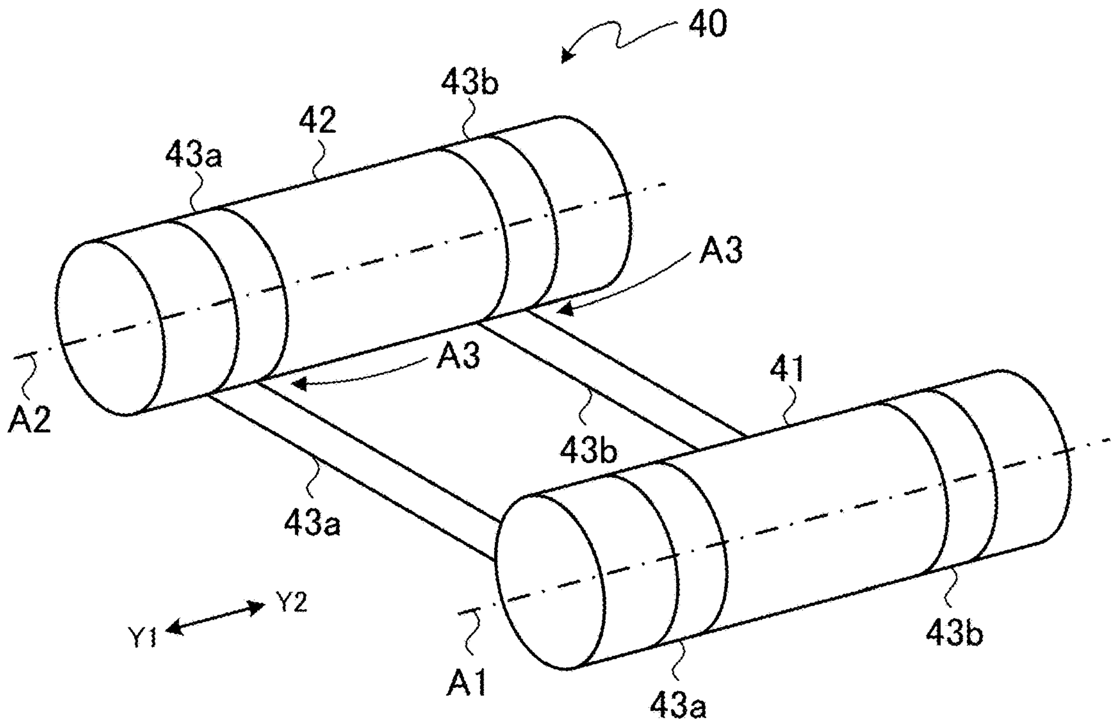
FIG. 2 is a perspective view of the sheet storage.
Figure 3:
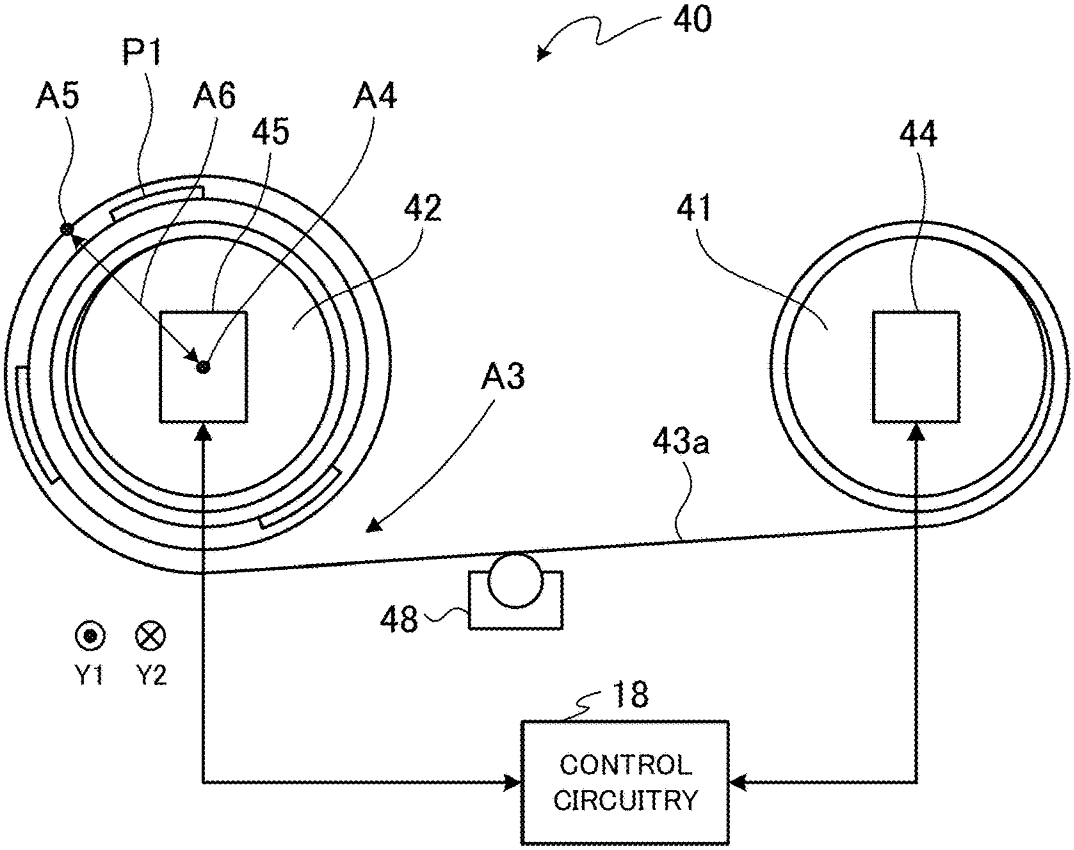
FIG. 3 is a side view of the sheet storage.

FIG. 2 is a perspective view of a sheet storage 40. FIG. 3 is a side view of the sheet storage 40. Some of the components illustrated in FIG. 3, such as the control circuitry 18, are not illustrated in FIG. 2.

The sheet storage 40 is applied to, for example, a storage unit that stores sheets by winding with the tape. In the examples to be described in the present embodiment, the sheet storage 40 is applied to the temporary storage unit 19, the second storage unit 24, and the third storage unit 25 (see FIG. 1). The sheet storage 40 is configured to store sheets transported on a transport path connected to the sheet storage 40, and feed out the stored sheets to the transport path connected to the sheet storage 40.

As illustrated in FIGS. 2 and 3, the sheet storage 40 comprises a reel 41, a drum 42, tapes 43*a* and 43*b*, and drive units 44 and 45.

Operations of the sheet storage 40 are controlled by the control circuitry 18. To be more specific, the control circuitry 18 controls the drive units 44 and 45, and stores sheets in the sheet storage 40. Note that a control circuitry other than the control circuitry 18 may be provided and the operations of the sheet storage 40 may be controlled by the control circuitry. A single control circuitry may be provided other than the control circuitry 18, and the single control circuitry may control a plurality of the sheet storages 40. Alternatively, a plurality of control circuitrys may be provided other than the control circuitry 18, and the plurality of control circuitries may respectively control the plurality of sheet storages 40.

Note that at least one of the other storage units may be configured by the sheet storage 40, which is a winding-type storage unit storing sheets by winding with a tape, instead of the temporary storage unit 19, the second storage unit 24, and the third storage unit 25 (see FIG. 1). Alternatively, at least one of the other storage units may be configured by the sheet storage 40, in addition to the temporary storage unit 19, the second storage unit 24, and the third storage unit 25 (see FIG. 1).

One ends of the tapes 43*a* and 43*b* are connected to the reel 41, and the tapes 43*a* and 43*b* are wound around the reel 41. The dashed line A1 illustrated in FIG. 2 indicates the rotation axis of the reel 41.

The rotation axis of the drum 42 is provided so as to be parallel to the rotation axis of the reel 41. The dashed line A2 indicates the rotation axis of the drum 42. The drum 42 is provided so that the rotation axis of the drum 42 indicated by the dashed line A2 is parallel to the rotation axis of the reel 41 indicated by the dashed line A1.

The other ends of the tapes 43*a* and 43*b* are connected to the drum 42. When a sheet is stored on the drum 42, the drum 42 winds the tapes 43*a* and 43*b* pulled out from the reel 41.

The tapes 43*a* and 43*b* wound around the drum 42 are pulled out from the drum 42. When the sheet stored using the drum 42 is fed out, the tapes 43*a* and 43*b* pulled out from the drum 42 are wound by the reel 41.

As indicated by the arrows A3 in FIGS. 2 and 3, the sheet transported on the transport path connected to the sheet storage 40 is inserted between the tapes 43*a* and 43*b* pulled out from the reel 41, which are the tapes 43*a* and 43*b* before being wound around the drum 42, and the outermost tapes 43*a* and 43*b* wound around the outer circumference of the drum 42. The sheet inserted between the tapes 43*a* and 43*b* pulled out from the reel 41 and the outermost tapes 43*a* and 43*b* wound around the outer circumference of the drum 42 is wound around the drum 42 together with the tapes 43*a* and 43*b* by the rotation of the drum 42. For example, the sheet is wound around the drum 42 together with the tapes 43*a* and 43*b* by the clockwise rotation of the drum 42 when viewed toward the direction Y2.

The sheet wound around the drum 42 together with the tapes 43*a* and 43*b* is released from the drum 42 by the rotation of the drum 42, and fed out to the transport path connected to the sheet storage 40. For example, the sheet wound around the drum 42 together with the tapes 43*a* and 43*b* is released from the drum 42 by the counterclockwise rotation of the drum 42 when viewed toward the direction Y2, and fed out to the transport path connected to the sheet storage 40.

The drive unit 44 rotates the reel 41 clockwise or counterclockwise around the rotation axis, viewed from the extending direction of the rotation axis.

In the following, the rotation direction in which the tapes 43*a* and 43*b* of the reel 41 are pulled out is called a pulling out direction. In addition, the rotation direction in which the tapes 43*a* and 43*b* of the reel 41 are wound is called a winding direction.

The drive unit 45 rotates the drum 42 clockwise or counterclockwise viewed from the extending direction of the rotation axis.

The drive units 44 and 45 are, for example, stepper motors. Note that the drive units 44 and 45 may be motors other than stepper motors as long as the control described in the present disclosure is applicable.

In the following, the rotation direction in which the tapes 43*a* and 43*b* of the drum 42 are wound is called a winding direction. In addition, the rotation direction in which the tapes 43*a* and 43*b* of the drum 42 are pulled out is called a pulling out direction.

The control circuitry 18 controls at least one of the drive units 44 and 45 to change the tension acting on the tapes 43*a* and 43*b* according to the state of the sheet storage 40 or the sheet processing apparatus 1.

The control circuitry 18 controls the drive unit 44 and rotates the reel 41 in the pulling out direction or the winding direction. The control circuitry 18 also controls the drive unit 45 and rotates the drum 42 in the winding direction or the pulling out direction.

For example, when controlling the drive unit 44 to rotate the reel 41 in the pulling out direction, the control circuitry 18 controls the drive unit 45 and rotates the drum 42 in the winding direction. When controlling the drive unit 44 to rotate the reel 41 in the winding direction, the control circuitry 18 controls the drive unit 45 and rotates the drum 42 in the pulling out direction.

The control circuitry 18 may control the drive units 44 and/or 45 to change the tension of the tapes 43*a* and 43*b* according to the state of at least one of the sheet storage 40 and the sheet processing apparatus 1.

For example, the control circuitry 18 rotates the reel 41 in the pulling out direction and rotates the drum 42 in the winding direction. In this case, the control circuitry 18 controls the drive units 44 and 45 to change the tension of the tapes 43*a* and 43*b*.

Likewise, the control circuitry 18 rotates the reel 41 in the winding direction and rotates the drum 42 in the pulling out direction. In this case, the control circuitry 18 controls the drive units 44 and 45 to change the tension of the tapes 43*a* and 43*b*.

Note that the control circuitry 18 may control the rotation velocity and torque of the drive units 44 and 45 using Pulse Width Modulation (PWM), for example.

The control circuitry 18 changes the tension of the tapes 43*a* and 43*b* not only by controlling the drive units 44 and 45 according to the state of the sheet storage 40 or the sheet processing apparatus 1. The control circuitry 18 may change the tension of the tapes 43*a* and 43*b* by controlling either one of the drive units 44 and 45 according to the state of the sheet storage 40 or the sheet processing apparatus 1.

Incidentally, the moving velocity of the tapes 43*a* and 43*b* indicates the velocity of the tapes 43*a* and 43*b* between the reel 41 and the drum 42 in the following description.

(Exemplary Operation of Sheet Storage Unit 40)

Figure 4:
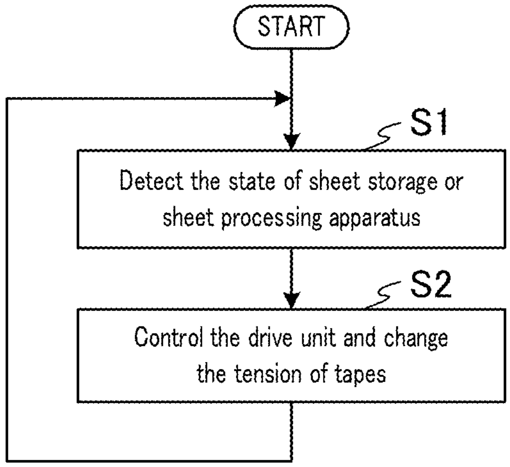
FIG. 4 is a flowchart describing an exemplary operation of the sheet storage.

FIG. 4 is a flowchart describing an exemplary operation of the sheet storage 40. The control circuitry 18 performs the control illustrated in FIG. 4 according to the state of the sheet storage 40, for example. The control circuitry 18 performs the control illustrated in FIG. 4 for the sheet storage 40 during the operation of storing sheets, for the sheet storage 40 during the operation of feeding sheets out, and for the sheet storage 40 that has stopped operating, for example. In addition, the control circuitry 18 performs the control illustrated in FIG. 4 based on the type or direction of sheets to be stored in the sheet storage 40, for example. Further, the control circuitry 18 performs the control illustrated in FIG. 4 based on the number of the sheet storages 40 that operate at the same time or on power consumption of the sheet processing apparatus 1, for example. That is, the control circuitry 18 controls the sheet storage 40 as necessary during the operation of the sheet processing apparatus 1.

When the sheet processing apparatus 1 is activated, the control circuitry 18 starts the processing of the step S1. That is, the control circuitry 18 detects the state of the sheet storage 40 or the state of the sheet processing apparatus 1 (step S1). As described later, the state of the sheet storage 40 includes, for example, the states [1] to [5] in FIG. 5, and the state of the sheet processing apparatus 1 includes, for example, the state [6] in FIG. 5.

The control circuitry 18 controls the drive units 44 and 45 according to the state of the sheet storage 40 or the state of the sheet processing apparatus 1 detected in the step S1, and changes the tension of the tapes 43*a* and 43*b* (step S2). For example, the control circuitry 18 controls either one or both of the drive units 44 and 45 according to the state of the sheet storage 40 or the state of the sheet processing apparatus 1 detected in the step S1, and changes the tension of the tapes 43*a* and 43*b*.

The control circuitry 18 then returns to the processing of the step S1, and monitors the state of the sheet storage 40 or the state of the sheet processing apparatus 1. The control circuitry 18 monitors the state of the sheet storage 40 or the state of the sheet processing apparatus 1 from activation to shutdown of the sheet processing apparatus 1 (from power on to off), controls either one or both of the drive units 44 and 45 according to the state of the sheet storage 40 or the state of the sheet processing apparatus 1, and changes the tension of the tapes 43*a* and 43*b*.

FIG. 5 is a chart for describing tension control for the tapes 43*a* and 43*b*. [1] to [5] in the vertical columns in FIG. 5 indicate examples of the state of the sheet storage 40. [6] in the vertical column in FIG. 5 indicates an example of the state of the sheet processing apparatus 1. The tension setting levels in the horizontal columns in FIG. 5 indicate examples of tension levels acting on the tapes 43*a* and 43*b*. The tension setting levels illustrated in FIG. 5 are stored in the memory 17 (see FIG. 1) in advance.

Note that the control circuitry 18 performs the processing illustrated in FIG. 4 based on at least one of the states [1] to [5] of the sheet storage 40 and the state [6] of the sheet processing apparatus 1 illustrated in FIG. 5, and controls the tension acting on the tapes 43*a* and 43*b*.

The control circuitry 18 controls the drive units 44 and 45 according to the state of the sheet storage 40 or the sheet processing apparatus 1, and changes the tension of the tapes 43*a* and 43*b* in phases. For example, the control circuitry 18 controls the drive units 44 and 45 according to the state of the sheet storage 40 or the sheet processing apparatus 1, and changes the tension of the tapes 43*a* and 43*b* so that the tension is appropriate for the state of the sheet storage 40 or the sheet processing apparatus 1.

To be more specific, the control circuitry 18 controls the drive units 44 and 45 according to the state of the sheet storage 40 or the sheet processing apparatus 1 so that a predetermined tension is applied to the tapes 43*a* and 43*b*. For example, the tension of the tapes 43*a* and 43*b* is varied discretely, linearly, or nonlinearly, for example, according to the state of the sheet storage 40 or the sheet processing apparatus 1.

As a specific example, a description will be given of a case where the tension of the tapes 43*a* and 43*b* is discretely changed according to the state of the sheet storage 40 or the sheet processing apparatus 1. When the control circuitry 18 controls the drive units 44 and 45 according to the state of the sheet storage 40 or the sheet processing apparatus 1, and increases the tension acting on the tapes 43*a* and 43*b*, the control circuitry 18 changes the tension from the normal state tension (Ts [N]) to, for example, +5%, +10%, +15%, and +20%. Meanwhile, when the control circuitry 18 controls the drive units 44 and 45 according to the state of the sheet storage 40 or the sheet processing apparatus 1, and decreases the tension acting on the tapes 43*a* and 43*b*, the control circuitry 18 changes the tension from the normal state tension (Ts [N]) to, for example, −5%, −10%, −15%, and −20%. Note that the value of a % (where a=±5, ±10, ±15, and ±20) may be changed as appropriate. Here, the normal state is each of the states described in the state examples [1] to [6] (see FIG. 5) of the sheet storage 40 and the sheet processing apparatus 1. In the state example [1] of the sheet storage 40, for example, the normal state is a state where the number of sheets stored in the sheet storage 40 is equal to or greater than zero and less than X1. Note that the normal state tension (Ts [N]) is a reference value in changing (±a %: examples above) the tension acting on the tapes 43*a* and 43*b*.

That is, the control circuitry 18 controls the drive units 44 and 45 according to the state of the sheet storage 40 or the sheet processing apparatus 1, and increases the tension of the tapes 43*a* and 43*b* in phases with respect to a predetermined tension or decreases the tension of the tapes 43*a* and 43*b* in phases with respect to the predetermined tension. In the following, the predetermined tension (Ts [N]) is referred to as a normal tension.

[1] in FIG. 5, which is a state of the number of stored sheets, will be described.

The control circuitry 18 controls the drive units 44 and 45 according to the quantity of sheets wound around the drum 42, and changes the tension of the tapes 43*a* and 43*b*. For example, the control circuitry 18 controls the drive units 44 and 45 according to the number of sheets wound around the drum 42, and changes the tension of the tapes 43*a* and 43*b*.

To be more specific, the control circuitry 18 determines that the sheet storage 40 is in a normal state when the number of sheets wound around the drum 42 is equal to or greater than zero and less than X1. When determining that the sheet storage 40 is in a normal state, the control circuitry 18 controls the drive units 44 and 45 to set the tension of the tapes 43*a* and 43*b* to the normal tension.

When the number of sheets wound around the drum 42 is equal to or greater than X1 and less than X2, the control circuitry 18 controls the drive units 44 and 45 to decrease the tension of the tapes 43*a* and 43*b* by 5% or 10% from the normal tension. Meanwhile, when the number of sheets wound around the drum 42 is equal to or greater than X2, the control circuitry 18 controls the drive units 44 and 45 to decrease the tension of the tapes 43*a* and 43*b* by 15% or 20% from the normal tension.

Note that the control circuitry 18 is configured to be capable of acquiring the number of sheets wound around the drum 42. The control circuitry 18 can acquire the number of sheets wound around the drum 42 based on information acquired from a sensor (not illustrated) provided in the sheet storage 40. Note that the control circuitry 18 may acquire the number of sheets wound around the drum 42 based on information acquired by the recognition unit 16 or information from a sensor that is provided on a transport path connected to the sheet storage 40 to detect passage of sheets.

The diameter, including the tapes 43*a* and 43*b*, of the reel 41 decreases as the drum 42 winds sheets. For example, the diameter of the reel 41 with the tapes 43*a* and 43*b* wound thereon, i.e., the diameter of the outermost circumference of the tapes 43*a* and 43*b* decreases.

The tension of the tapes 43*a* and 43*b* increases as the diameter of the reel 41 including the tapes 43*a* and 43*b* decreases. As described above, the control circuitry 18 controls the drive units 44 and 45 according to the increase in the number of sheets wound around the drum 42, and decreases the tension of the tapes 43*a* and 43*b*. That is, when the quantity of sheets wound around the drum 42 changes from the first quantity to the second quantity (the second quantity>the first quantity), the control circuitry 18 controls the drive units 44 and 45 to decrease the tension of the tapes 43*a* and 43*b* from the tension of the tapes 43*a* and 43*b* set in the case of the first quantity. For example, when the number of sheets wound around the drum 42 is equal to or greater than X2, the control circuitry 18 controls the drive units 44 and 45 to decrease the tension of the tapes 43*a* and 43*b* from the tension of the tapes 43*a* and 43*b* set in the case where the number of sheets wound around the drum 42 is equal to or greater than X1 and less than X2.

This allows the sheet storage 40 to reduce unnecessary energy consumption, thereby reducing power consumption.

[2] in FIG. 5, which is a state during the operation of the tapes, will be described.

The control circuitry 18 controls the drive units 44 and 45 according to the acceleration of the tapes 43*a* and 43*b*, and changes the tension of the tapes 43*a* and 43*b*.

First, a description will be given of control in a case where the tapes 43*a* and 43*b* move at a constant velocity.

The control circuitry 18 determines that the sheet storage 40 is in a normal state when the tapes 43*a* and 43*b* fed from the reel 41 move at a constant velocity. When determining that the sheet storage 40 is in a normal state, the control circuitry 18 controls the drive units 44 and 45 to set the tension of the tapes 43*a* and 43*b* to the normal tension. The case where the tapes 43*a* and 43*b* move at a constant velocity corresponds to the case where the tapes 43*a* and 43*b* move with zero acceleration.

Next, a description will be given of control in a case where the tapes 43*a* and 43*b* move with acceleration or deceleration.

Here, the case where the tapes 43*a* and 43*b* accelerate corresponds to the case where the tapes 43*a* and 43*b* accelerate from a standstill to a constant velocity. Meanwhile, the case where the tapes 43*a* and 43*b* decelerate corresponds to the case where the tapes 43*a* and 43*b* decelerate from a constant velocity to a standstill.

When the tapes 43*a* and 43*b* do not move at a constant velocity, the tension of the tapes 43*a* and 43*b* easily fluctuates compared with the case where the tapes 43*a* and 43*b* move at a constant velocity. To be more specific, when the tapes 43*a* and 43*b* accelerate or decelerate, the tension of the tapes 43*a* and 43*b* easily fluctuates compared with the case where the tapes 43*a* and 43*b* move at a constant velocity. When the tapes 43*a* and 43*b* accelerate or decelerate, the tension of the tapes 43*a* and 43*b* tends to be higher or lower than the tension of the tapes 43*a* and 43*b* in the case where the tapes 43*a* and 43*b* move at a constant velocity. As a result, the tapes 43*a* and 43*b* get stretched or slackened too much.

When the tapes 43*a* and 43*b* accelerate or decelerate, the control circuitry 18 controls the drive units 44 and 45 and adjusts the tension of the tapes 43*a* and 43*b* so that the tapes 43*a* and 43*b* do not get stretched or slackened too much.

For example, when the tapes 43*a* and 43*b* move with acceleration, the tapes 43*a* and 43*b* sometimes get stretched too much, and when the tapes 43*a* and 43*b* move with deceleration, the tapes 43*a* and 43*b* sometimes get slackened too much. Further, when the tapes 43*a* and 43*b* move with acceleration according to the state of the sheet storage 40, the tapes 43*a* and 43*b* sometimes get slackened too much, and when the tapes 43*a* and 43*b* move with deceleration according to the state of the sheet storage 40, the tapes 43*a* and 43*b* sometimes get stretched too much.

The control circuitry 18 controls the drive units 44 and 45 to set the tension of the tapes 43*a* and 43*b* higher or lower than the normal tension. When the tapes 43*a* and 43*b* are easily stretched, the control circuitry 18 controls the drive units 44 and 45 to decrease the tension of the tapes 43*a* and 43*b* by, for example, 10% or 15% from the normal tension. When the tapes 43*a* and 43*b* are easily slackened, in contrast, the control circuitry 18 controls the drive units 44 and 45 to increase the tension of the tapes 43*a* and 43*b* by, for example, 10% or 15% from the normal tension.

The control circuitry 18 sends control information to the drive units 44 and 45, for example, and controls the moving velocity of the tapes 43*a* and 43*b*. Thus, the control circuitry 18 can be aware of the state (constant velocity, acceleration, or deceleration) of the tapes 43*a* and 43*b* from the control information to be sent to the drive units 44 and 45.

Such control prevents the tapes 43*a* and 43*b* from getting easily slackened or stretched when the tapes 43*a* and 43*b* accelerate or decelerate.

The processing described above prevents sheets from getting jammed in the sheet storage 40. Further, the sheet storage 40 can reduce unnecessary energy consumption when the tapes 43*a* and 43*b* accelerate, thereby reducing power consumption.

[3] in FIG. 5, which is a kind of a wound sheet, will be described.

The control circuitry 18 controls the drive units 44 and 45 according to the type of a sheet wound around the drum 42, and change the tension of the tapes 43*a* and 43*b*. For example, the control circuitry 18 changes the tension of the tapes 43*a* and 43*b* according to at least one of the currency, denomination, and fitness of the sheet wound around the drum 42.

To be more specific, the control circuitry 18 determines that the sheet storage 40 is in a normal state when the sheet processed by the sheet storage 40 is a normal sheet. When determining that the sheet storage 40 is in a normal state, the control circuitry 18 controls the drive units 44 and 45 to set the tension of the tapes 43*a* and 43*b* to the normal tension.

In the present embodiment, a normal sheet (normal note) and a sheet other than the normal sheet (note other than the normal note) are assumed to be the following sheets.

The normal sheet (normal note) is a sheet made of paper. The sheet other than the normal sheet (note other than the normal note) is, for example, a sheet with partially different thicknesses, and a sheet stiffer than the normal sheet. To be more specific, the sheet other than the normal sheet is, for example, a hybrid sheet, a polymer sheet, and a sheet including a metal thread. The polymer sheet is, for example, a sheet with a transparent section formed from a sheet made of polymer and an opaque section formed from paper made from plant fibers or synthetic fibers. The polymer sheet is, for example, a sheet formed entirely from a sheet made of polymer. In the description of the present embodiment, the above examples are treated as the normal sheet and the sheet other than the normal sheet, and the control regarding [3] in FIG. 5 is performed.

When the sheet storage 40 processes the sheet other than the normal sheet, the control circuitry 18 controls the drive units 44 and 45 to set the tension of the tapes 43*a* and 43*b* higher than the normal tension. For example, when the sheet storage 40 processes a hybrid sheet or a stiff sheet, the control circuitry 18 controls the drive units 44 and 45 to set the tension of the tapes 43*a* and 43*b* higher than the normal tension. For example, the control circuitry 18 controls the drive units 44 and 45 to increase the tension of the tapes 43*a* and 43*b* by 10% or 15% from the normal tension.

The control circuitry 18 can determine whether the sheet processed by the sheet storage 40 is a hybrid sheet by acquiring currency or denomination information of the sheet from the recognition unit 16, for example. In addition, the control circuitry 18 can determine whether the sheet processed by the sheet storage 40 is a stiff sheet by acquiring currency, denomination, or fitness information of the sheet from the recognition unit 16, for example.

When hybrid sheets with inconsistent thickness or stiff sheets are wound around the drum 42, for example, the shape of the drum 42 with the sheets wound thereon sometimes becomes roughly a truncated cone in view of the reel 41 as more sheets are wound. As described above, the control circuitry 18 controls the drive units 44 and 45 to set the tension of the tapes 43*a* and 43*b* higher than the normal tension when the sheet storage 40 processes a hybrid sheet or a stiff sheet.

This allows the sheet storage 40 to wind sheets while preventing the shape of the drum 42 with the sheets wound thereon from getting roughly a truncated cone, for example. As a result, more sheets can be stored. Further, the sheet storage 40 winds sheets while preventing the shape of the drum 42 with the sheets wound thereon from getting roughly a truncated cone, thereby preventing the sheets from getting jammed, for example.

[4] in FIG. 5, which is a direction of a wound sheet, will be described.

The control circuitry 18 controls the drive units 44 and 45 according to the direction of a sheet wound around the drum 42, and changes the tension of the tapes 43*a* and 43*b*. The direction of the sheet wound around the drum 42 includes four directions: face-up and portrait-up; face-up and portrait-down; face-down and portrait-up; and face-down and portrait-down.

The control circuitry 18 determines that the sheet storage 40 is in a normal state when less than Y1 sheets are wound around the drum 42 in the same direction. When determining that the sheet storage 40 is in a normal state, the control circuitry 18 controls the drive units 44 and 45 to set the tension of the tapes 43*a* and 43*b* to the normal tension.

When Y1 or more and less than Y2 sheets are wound around the drum 42 in the same direction, the control circuitry 18 controls the drive units 44 and 45 to set the tension of the tapes 43*a* and 43*b* higher than the normal tension. For example, the control circuitry 18 controls the drive units 44 and 45 to increase the tension of the tapes 43*a* and 43*b* by 5% from the normal tension.

When Y2 or more sheets are wound around the drum 42 in the same direction, the control circuitry 18 controls the drive units 44 and 45 to set the tension of the tapes 43*a* and 43*b* higher than the tension in the case of Y1 or more and less than Y2 sheets. For example, the control circuitry 18 controls the drive units 44 and 45 to increase the tension of the tapes 43*a* and 43*b* by 10% from the normal tension.

The control circuitry 18 can acquire the direction of a sheet wound around the drum 42 from the recognition unit 16, for example.

When sheets are wound around the drum 42 in the same direction, the shape of the drum 42 with the sheets wound thereon sometimes becomes a truncated cone in view of the reel 41 as more sheets are wound. As described above, the control circuitry 18 controls the drive units 44 and 45 according to the direction of a sheet wound around the drum 42, and sets the tension of the tapes 43*a* and 43*b* higher than the normal tension.

This allows the sheet storage 40 to wind sheets so that the shape of the drum 42 with the sheets wound thereon is a cylinder, for example; accordingly, more sheets can be stored. Further, the sheet storage 40 winds sheets so that the shape of the drum 42 with the sheets wound thereon is a cylinder, thereby preventing the sheets from getting jammed, for example.

[5] in FIG. 5, which is the number of units operating at the same time, will be described.

The control circuitry 18 controls the drive units 44 and 45 according to the number of the sheet storages 40 that operate at the same time, and changes the tension of the tapes 43*a* and 43*b*.

For example, the sheet processing apparatus 1 comprises Z sheet storages 40.

When less than Z1 (Z1<Z) sheet storages 40 operate at the same time, the control circuitry 18 determines that the simultaneously operating sheet storages 40 are in normal states. When determining that the sheet storages 40 are in normal states, the control circuitry 18 controls the drive units 44 and 45 to set the tension of the tapes 43*a* and 43*b* to the normal tension.

When determining that Z1 or more sheet storages 40 among the Z sheet storages 40 operate at the same time, the control circuitry 18 controls the drive units 44 and 45 of at least one of the simultaneously operating sheet storages 40, and set the tension of the tapes 43*a* and 43*b* lower than the normal tension. For example, the control circuitry 18 controls the drive units 44 and 45 to decrease the tension of the tapes 43*a* and 43*b* of the simultaneously operating sheet storages 40 by 5% from the normal tension. In other words, when the first sheet storage 40 and the second sheet storage 40 operate at the same time, the control circuitry 18 controls a drive unit of the first sheet storage 40 to change the tension of tapes of the first sheet storage 40 according to the states of the first sheet storage 40 and the second sheet storage 40.

In the control circuitry 18, the transport destination of a sheet is determined based on the recognition result of the sheet by the recognition unit 16, for example. In other words, the control circuitry 18 determines the number of the simultaneously operating sheet storages 40 based on the recognition result of the sheet by the recognition unit 16, and controls the drive units 44 and 45 of the sheet storages 40.

The number (e.g., less than Z1) of the sheet storages 40 that can operate at the same time is determined in advance so that the sheet processing apparatus 1 operates within the normal rated power of a power supply (not illustrated) provided in the sheet processing apparatus 1.

As described above, when determining that Z1 or more sheet storages 40 among the Z sheet storages 40 operate at the same time, the control circuitry 18 controls the drive units 44 and 45 of at least one of the simultaneously operating sheet storages 40, and set the tension of the tapes 43*a* and 43*b* lower than the normal tension.

This allows the sheet storages 40 to reduce power consumption and prevents the power supplies from going down.

[6] in FIG. 5, which is real time power consumption of a unit, will be described.

The control circuitry 18 controls the drive units 44 and 45 according to the power consumption of the sheet processing apparatus 1, and changes the tension of the tapes 43*a* and 43*b*.

The control circuitry 18 monitors the power consumption of the sheet processing apparatus 1 all the time. The control circuitry 18 determines that the sheet processing apparatus 1 is in a normal state when the power consumption of the sheet processing apparatus 1 is less than V1% of the normal rated power of a power supply provided in the sheet processing apparatus 1. When determining that the sheet processing apparatus 1 is in a normal state, the control circuitry 18 controls the drive units 44 and 45 to set the tension of the tapes 43*a* and 43*b* to the normal tension.

The normal rated power for the sheet processing apparatus 1 is determined in the specification of the apparatus, for example. The control circuitry 18 monitors the power consumption of the sheet processing apparatus 1, and controls the drive units 44 and 45 to set the tension of the tapes 43*a* and 43*b* lower as the power consumption reaches the normal rated power. Note that the control circuitry 18 can acquire the power consumption of the sheet processing apparatus 1 by, for example, monitoring the voltage and current supplied to the power supply of the sheet processing apparatus 1.

When the power consumption of the sheet processing apparatus 1 is equal to or greater than V1% and less than V2% of the normal rated power, the control circuitry 18 controls the drive units 44 and 45 to decrease the tension of the tapes 43*a* and 43*b* by 5% from the normal tension.

When the power consumption of the sheet processing apparatus 1 is equal to or greater than V2% and less than V3% of the normal rated power, the control circuitry 18 controls the drive units 44 and 45 to decrease the tension of the tapes 43*a* and 43*b* by 10% from the normal tension.

When the power consumption of the sheet processing apparatus 1 is equal to or greater than V3% of the normal rated power, the control circuitry 18 controls the drive units 44 and 45 to decrease the tension of the tapes 43*a* and 43*b* by 15% from the normal tension.

Note that the control circuitry 18 may monitor the power consumption of the sheet processing apparatus 1 at predetermined time intervals, e.g., 1 ms.

This allows the sheet storage 40 to reduce power consumption and prevents the power supply from going down.

As described above, the sheet storage 40 comprises: the reel 41 with the tapes 43*a* and 43*b* wound thereon; the drive unit 44 that rotates the reel 41 around the rotation axis; the drum 42 that is connected to the reel 41 via the tapes 43*a* and 43*b* and winds sheets together with the tapes 43*a* and 43*b* wound around the reel 41; the drive unit 45 that rotates the drum 42 around the rotation axis; and the control circuitry 18 that controls at least one of the drive units 44 and 45 to change the tension acting on the tapes 43*a* and 43*b* according to the state of the sheet storage 40. This configuration improves the performance of the sheet storage 40.

(Variation of Embodiment 1)

In the description of [1] in FIG. 5, the control circuitry 18 changes the tension of the tapes by controlling the drive units 44 and 45 according to the number of sheets wound around the drum 42, but the present embodiment is not limited to this. The control circuitry 18 may change the tension of the tapes based on the distance, viewed from the extending direction of the rotation axis of the drum 42, between the rotation axis of the drum 42 and any point of the outermost circumference of the tapes 43*a* and 43*b* wound around the drum 42 together with the sheets. The distance between the rotation axis of the drum 42 and any point of the outermost circumference of the tapes 43*a* and 43*b* wound around the drum 42 together with the sheets corresponds to the quantity of the sheets wound around the drum 42. That is, the quantity of the sheets wound around the drum 42 increases as the distance increases between the rotation axis of the drum 42 and any point of the outermost circumference of the tapes 43*a* and 43*b* wound around the drum 42 together with the sheets.

For example, the point A4 illustrated in FIG. 3 indicates the position of the rotation axis of the drum 42. The point A5 indicates a point of the outermost circumference of the tapes 43*a* and 43*b* wound around the drum 42 together with the sheets P1. The control circuitry 18 may change the tension of the tapes 43*a* and 43*b* based on the distance A6 between the point A4 and the point A5.

To be more specific, the control circuitry 18 determines that the sheet storage 40 is in a normal state when the distance A6 is less than D1. When determining that the sheet storage 40 is in a normal state, the control circuitry 18 controls the drive units 44 and 45 to set the tension of the tapes 43*a* and 43*b* to the normal tension.

When the distance A6 is equal to or greater than D1 and less than D2, the control circuitry 18 controls the drive units 44 and 45 to decrease the tension of the tapes 43*a* and 43*b* by 5% or 10% from the normal tension. Meanwhile, when the distance A6 is equal to or greater than D2, the control circuitry 18 controls the drive units 44 and 45 to decrease the tension of the tapes 43*a* and 43*b* by 15% or 20% from the normal tension.

Note that the distance A6 can be determined by the following method, for example. A velocity detection unit 48 in FIG. 3 comprises a rotation unit that engages with the tapes 43*a* and 43*b* and rotates according to the movement of the tapes 43*a* and 43*b*. The velocity detection unit 48 detects the moving velocity v of the tapes 43*a* and 43*b* based on the rotation velocity of the rotation unit. The control circuitry 18 determines the distance A6 from the moving velocity v detected by the velocity detection unit 48 and the angular velocity ω of the drum 42. The distance A6 is determined by dividing the moving velocity v by the angular velocity ω. Since the control circuitry 18 controls the drive unit 45 to rotate the drum 42, the control circuitry 18 can figure out the angular velocity ω of the drum 42 from the control information to control the drive unit 45.

Alternatively, the control circuitry 18 may determine the distance A6 based on, for example, the thickness of the tapes 43*a* and 43*b* and the number of rotations of the reel 41 or the drum 42.

(Another Variation of Embodiment 1)

The control circuitry 18 may change the tension of the tapes 43*a* and 43*b* by combining two or more of the states [1] to [6] described in FIG. 5.

Embodiment 2

A sheet storage 60 according to Embodiment 2 will be described with reference to FIG. 6 and FIG. 7. The sheet storage 60 uses four tapes to wind sheets in Embodiment 2 while the sheet storage 40 uses two tapes 43*a* and 43*b* to wind sheets in Embodiment 1.

The sheet storage 60 comprises reels 61*a* and 61*b*, a drum 62, tapes 63*a*, 63*b*, 64*a*, and 64*b*, rollers 65*a*, 65*b*, 66*a*, and 66*b*, drive units 67*a*, 67*b*, and 68, and the control circuitry

18. The control circuitry 18 controls the drive units 67*a*, 67*b*, and 68. Note that the control circuitry 18 is not illustrated in FIG. 6.

In Embodiment 2, the sheet storage 60 is applied to the temporary storage unit 19, the second storage unit 24, and the third storage unit 25 (see FIG. 1), as is the case with Embodiment 1 in which the sheet storage 40 is applied to the temporary storage unit 19, the second storage unit 24, and the third storage unit 25.

Alternatively, the sheet storage 60 may be applied to all storage units provided in the sheet processing apparatus 1 as in Embodiment 1.

The control circuitry 18 performs the processing described in FIG. 4 based on at least one of the states [1] to [6] described in FIG. 5, and adjusts the tension acting on the tapes 63*a*, 63*b*, 64*a*, and 64*b*.

The sheet storage 60 will be described in detail below.

One ends of the tapes 63*a* and 63*b* are connected to the reel 61*a*, and the tapes 63*a* and 63*b* are wound around the reel 61*a*.

The reel 61*b* is provided so that the rotation axis of the reel 61*b* is parallel to the rotation axis of the reel 61*a*. One ends of the tapes 64*a* and 64*b* are connected to the reel 61*b*, and the tapes 64*a* and 64*b* are wound around the reel 61*b*.

The roller 65*a* is provided so that the rotation axis of the roller 65*a* is parallel to the rotation axis of the reel 61*a*. The roller 65*a* changes the transport direction of the tapes 63*a* and 63*b*.

The roller 65*b* is provided so that the rotation axis of the roller 65*b* is parallel to the rotation axis of the reel 61*b*. The roller 65*b* changes the transport direction of the tapes 64*a* and 64*b*.

The roller 66*a* is provided so that the rotation axis of the roller 66*a* is parallel to the rotation axis of the reel 61*a*. The roller 66*b* is provided so that the rotation axis of the roller 66*b* is parallel to the rotation axis of the reel 61*b*.

The drum 62 is provided so that the rotation axis of the drum 62 is parallel to the rotation axes of the reels 61*a* and 61*b*. The other ends of the tapes 63*a* and 63*b* are connected to the drum 62. The tapes 64*a* and 64*b* are also connected to the drum 62. The drum 62 winds the tapes 63*a*, 63*b*, 64*a*, and 64*b* pulled out from the reels 61*a* and 61*b*. The drum 62 winds the tapes 63*a* and 64*a* in layers, and winds the tapes 63*b* and 64*b* in layers The tapes 63*a*, 63*b*, 64*a*, and 64*b* wound around the drum 62 are pulled out from the drum 62. The tapes 63*a* and 63*b* pulled out from the drum 62 are wound by the reel 61*a*. The tapes 64*a* and 64*b* pulled out from the drum 62 are wound by the reel 61*b*.

Figure 6:
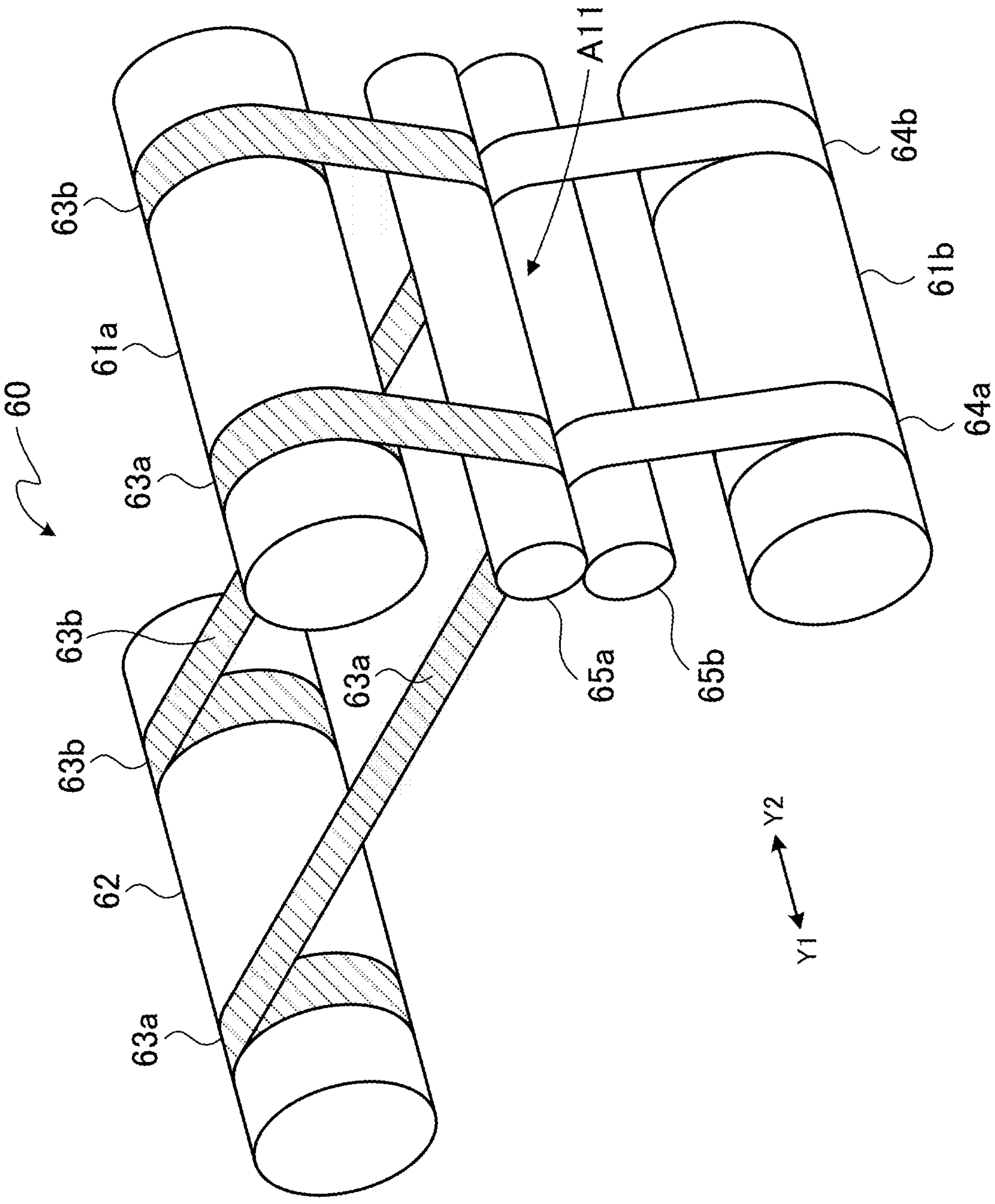
FIG. 6 is a perspective view of a sheet storage according to Embodiment 2.
Figure 7:
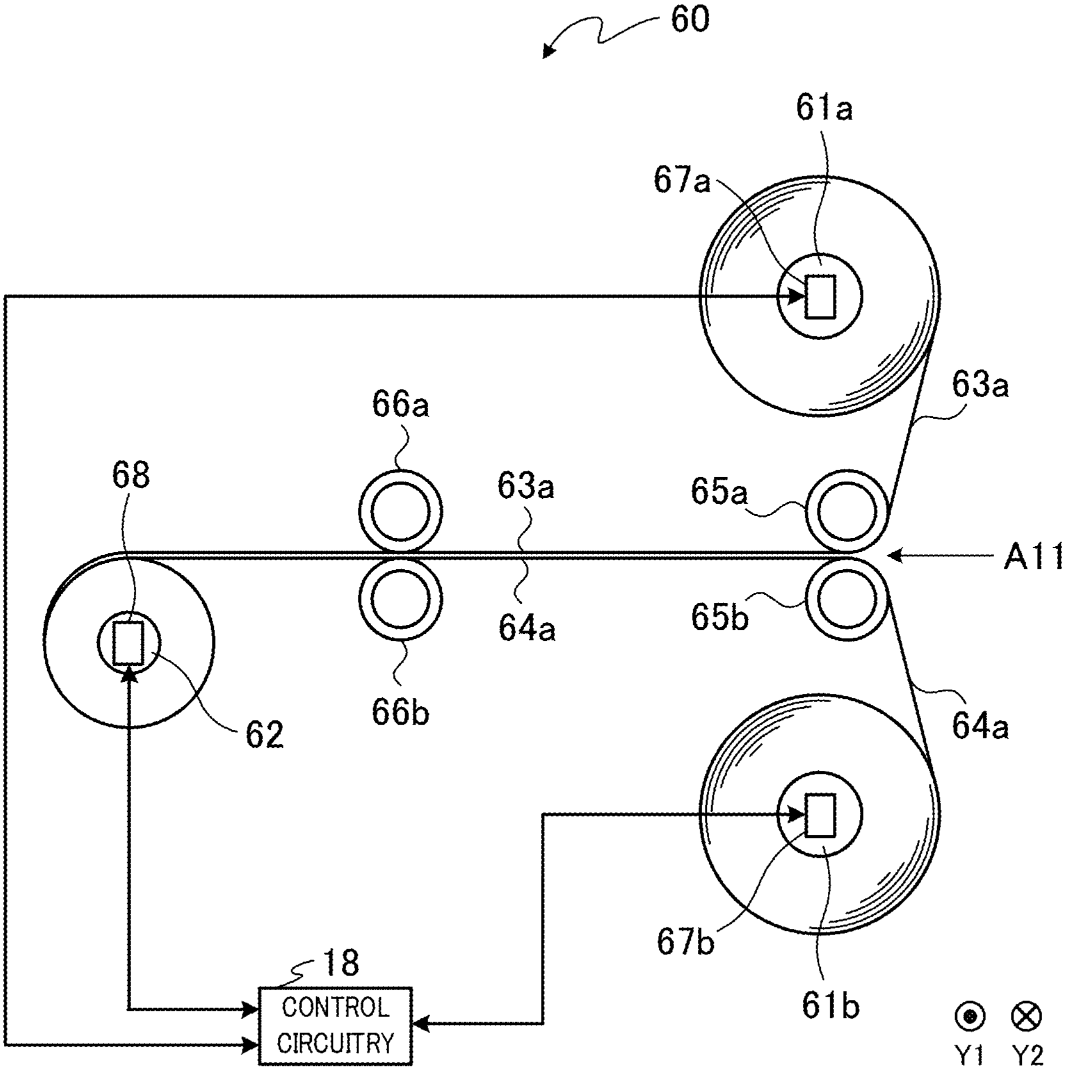
FIG. 7 is a side view of the sheet storage according to Embodiment 2.

A sheet transported by the third divergent path 15*d* is inserted, as indicated by arrows A11 in FIGS. 6 and 7, between the tapes 63*a* and 63*b* pulled out from the reel 61*a* and the tapes 64*a* and 64*b* pulled out from the reel 61*b*. The sheet inserted between the tapes 63*a* and 63*b* and the tapes 64*a* and 64*b* is wound around the drum 62 together with the tapes 63*a*, 63*b*, 64*a*, and 64*b* by the rotation of the drum 62. For example, the sheet is wound around the drum 62 together with the tapes 63*a*, 63*b*, 64*a*, and 64*b* by the counterclockwise rotation of the drum 62 when viewed toward the direction Y2.

The sheet wound around the drum 62 together with the tapes 63*a*, 63*b*, 64*a*, and 64*b* is released from the drum 62 by the rotation of the drum 62, and fed out to the transport path connected to the sheet storage 60. For example, the sheet wound around the drum 62 together with the tapes 63*a*, 63*b*, 64*a*, and 64*b* is released from the drum 62 by the clockwise rotation of the drum 62 when viewed toward the direction Y2, and fed out to the transport path connected to the sheet storage 60.

The drive unit 67*a* rotates the reel 61*a* clockwise or counterclockwise viewed from the extending direction of the rotation axis.

The drive unit 67*b* rotates the reel 61*b* clockwise or counterclockwise viewed from the extending direction of the rotation axis. Stepper motors, for example, may be used for the drive units 67*a* and 67*b*.

In the following, the rotation direction in which the tapes 63*a*, 63*b*, 64*a*, and 64*b* of the reels 61*a* and 61*b* are pulled out is sometimes called a pulling out direction. In addition, the rotation direction in which the tapes 63*a*, 63*b*, 64*a*, and 64*b* of the reels 61*a* and 61*b* are wound is sometimes called a winding direction.

The drive unit 68 rotates the drum 62 clockwise or counterclockwise viewed from the extending direction of the rotation axis. A stepper motor, for example, may be used for the drive unit 68.

In the following, the rotation direction in which the tapes 63*a*, 63*b*, 64*a*, and 64*b* of the drum 62 are wound is sometimes called a winding direction. In addition, the rotation direction in which the tapes 63*a*, 63*b*, 64*a*, and 64*b* of the drum 62 are pulled out is sometimes called a pulling out direction.

The control circuitry 18 controls at least one of the drive units 67*a* and 67*b* and the drive unit 68 to change the tension of the tapes 63*a*, 63*b*, 64*a*, and 64*b* according to the state of the sheet storage 60. For example, the control circuitry 18 changes the tension of the tapes 63*a*, 63*b*, 64*a*, and 64*b* according to the state of the sheet storage 60 as illustrated in FIG. 5.

The control circuitry 18 controls the drive units 67*a* and 67*b* to rotate the reels 61*a* and 61*b* in the pulling out direction or the winding direction. The control circuitry 18 also controls the drive unit 68 to rotate the drum 62 in the winding direction or the pulling out direction.

For example, when controlling the drive units 67*a* and 67*b* to rotate the reels 61*a* and 61*b* in the pulling out direction, the control circuitry 18 controls the drive unit 68 and rotates the drum 62 in the winding direction. When controlling the drive units 67*a* and 67*b* to rotate the reels 61*a* and 61*b* in the winding direction, the control circuitry 18 controls the drive unit 68 and rotates the drum 62 in the pulling out direction.

The control circuitry 18 may control at least one of the drive units 67*a* and 68 to change the tension of the tapes 63*a* and 63*b* according to the state of the sheet storage 60. In addition, the control circuitry 18 may control at least one of the drive units 67*b* and 68 to change the tension of the tapes 64*a* and 64*b* according to the state of the sheet storage 60.

The control circuitry 18 may control the moving velocity of the tapes 63*a*, 63*b*, 64*a*, and 64*b* using one(s) to be rotated in the winding direction among the reels 61*a* and 61*b* and the drum 62. The control circuitry 18 may control the tension of the tapes 63*a*, 63*b*, 64*a*, and 64*b* using one(s) to be rotated in the pulling out direction among the reels 61*a* and 61*b* and the drum 62.

To be more specific, the control circuitry 18 rotates the reels 61*a* and 61*b* in the pulling out direction, and rotates the drum 62 in the winding direction. In this case, the control circuitry 18 controls the rotation velocity of the drum 62 by the drive unit 68, and determines the moving velocity of the tapes 63*a*, 63*b*, 64*a*, and 64*b*, for example. The control circuitry 18 controls the torque of the reels 61*a* and 61*b* by the drive units 67*a* and 67*b*, and determines the tension of the tapes 63*a*, 63*b*, 64*a*, and 64*b*, for example.

Further, the control circuitry 18 rotates the reels 61*a* and 61*b* in the winding direction, and rotates the drum 62 in the pulling out direction. In this case, the control circuitry 18 controls the rotation velocity of the reels 61*a* and 61*b* by the drive units 67*a* and 67*b*, and determines the moving velocity of the tapes 63*a*, 63*b*, 64*a*, and 64*b*, for example. The control circuitry 18 controls the torque of the drum 62 by the drive unit 68, and determines the tension of the tapes 63*a*, 63*b*, 64*a*, and 64*b*, for example.

Note that the control circuitry 18 may control the rotation velocity and torque of the drive units 67*a*, 67*b*, and 68 using PWM, for example.

The control circuitry 18 may control the moving velocity of the tapes 63*a*, 63*b*, 64*a*, and 64*b* using one(s) to be rotated in the pulling out direction among the reels 61*a* and 61*b* and the drum 62. The control circuitry 18 may control the tension of the tapes 63*a*, 63*b*, 64*a*, and 64*b* using one(s) to be rotated in the winding direction among the reels 61*a* and 61*b* and the drum 62.

The control circuitry 18 changes the tension of the tapes 63*a*, 63*b*, 64*a*, and 64*b* not only by controlling either the drive units 67*a* and 67*b* or the drive unit 68 according to the state of the sheet storage 60. The control circuitry 18 may change the tension of the tapes 63*a*, 63*b*, 64*a*, and 64*b* by controlling both the drive units 67*a* and 67*b* and the drive unit 68 according to the state of the sheet storage 60.

As described above, the sheet storage 60 may store sheets using four tapes 63*a*, 63*b*, 64*a*, and 64*b*. Even in the case of using four tapes 63*a*, 63*b*, 64*a*, and 64*b*, the sheet storage 60 can still control the tension of the tapes 63*a*, 63*b*, 64*a*, and 64*b*, and improve the performance.

Embodiment 3

A sheet storage 80 according to Embodiment 3 will be described with reference to FIG. 8 and FIG. 9. Three tapes are used to wind sheets in Embodiment 3 while two tapes 43*a* and 43*b* are used to wind sheets in Embodiment 1.

The sheet storage 80 comprises reels 81*a*, 81*b*, and 81*c*, a drum 82, tapes 83*a*, 83*b*, and 83*c*, rollers 84*a*, 84*b*, 85*a*, 85*b*, 86*a*, and 86*b*, drive units 87*a*, 87*c*, and 88, a drive unit (not illustrated) to rotate the reel 81*b*, and the control circuitry 18. Note that, although the drive unit to rotate the reel 81*b* is not illustrated in FIG. 9, the control circuitry 18 controls the drive unit to rotate the reel 81*b*, and the drive units 87*a*, 87*c*, and 88. The control circuitry 18 is not illustrated in FIG. 8.

In Embodiment 3, the sheet storage 80 is applied to the temporary storage unit 19, the second storage unit 24, and the third storage unit 25 (see FIG. 1), as is the case with Embodiment 1 in which the sheet storage 40 is applied to the temporary storage unit 19, the second storage unit 24, and the third storage unit 25. Alternatively, the sheet storage 80 may be applied to all storage units provided in the sheet processing apparatus 1 as in Embodiment 1.

The control circuitry 18 performs the processing described in FIG. 4 based on at least one of the states [1] to [6] described in FIG. 5, and adjusts the tension acting on the tapes 83*a*, 83*b*, and 83*c*.

The sheet storage 80 will be described in detail below.

One end of the tape 83*a* is connected to the reel 81*a*, and the tape 83*a* is wound around the reel 81*a*.

The reel 81*b* is provided so that the reel 81*b* and the reel 81*a* have the same rotation axis, for example. One end of the tape 83*b* is connected to the reel 81*b*, and the tape 83*b* is wound around the reel 81*b*.

The reel 81*c* is provided so as to be parallel to the rotation axis of the reels 81*a* and 81*b*, for example. The reel 81*c* is provided between the reels 81*a* and 81*b* viewed from a direction vertical to the rotation axis of the reel 81*c*. One end of the tape 83*c* is connected to the reel 81*c*, and the tape 83*c* is wound around the reel 81*c*.

The roller 84*a* is provided so that the rotation axis of the roller 84*a* is parallel to the rotation axis of the reel 81*a*. The roller 84*a* changes the transport direction of the tape 83*a*.

The roller 84*b* is provided so that the rotation axis of the roller 84*b* is parallel to the rotation axis of the reel 81*b*. The roller 84*b* changes the transport direction of the tape 83*b*.

The roller 85*a* is provided so that the rotation axis of the roller 85*a* is parallel to the rotation axis of the reel 81*a*. The roller 85*a* changes the transport direction of the tape 83*a*. The roller 85*a* causes the tape 83*a* the transport direction of which has been changed by the roller 84*a* and the tape 83*a* the transport direction of which has been changed by the roller 86*a* to face in parallel.

The roller 85*b* is provided so that the rotation axis of the roller 85*b* is parallel to the rotation axis of the reel 81*b*. The roller 85*b* changes the transport direction of the tape 83*b*. The roller 85*b* causes the tape 83*b* the transport direction of which has been changed by the roller 84*b* and the tape 83*b* the transport direction of which has been changed by the roller 86*b* to face in parallel.

The roller 86*a* is provided so that the rotation axis of the roller 86*a* is parallel to the rotation axis of the reel 81*a*. The tape 83*a* the transport direction of which has been changed by the roller 85*a* moves around the drum 82 and is guided to the roller 86*a*. The roller 86*a* guides the tape 83*a* and changes the transport direction. The tape 83*a* is then guided to the drum 82.

The roller 86*b* is provided so that the rotation axis of the roller 86*b* is parallel to the rotation axis of the reel 81*b*. The tape 83*b* the transport direction of which has been changed by the roller 85*b* moves around the drum 82 and is guided to the roller 86*b*. The roller 86*b* guides the tape 83*b* and changes the transport direction. The tape 83*b* is then guided to the drum 82.

The drum 82 is provided so that the rotation axis of the drum 82 is parallel to the rotation axes of the reels 81*a*, 81*b*, and 81*c*. The other ends of the tapes 83*a*, 83*b*, and 83*c* are connected to the drum 82. The drum 82 winds the tapes 83*a*, 83*b*, and 83*c* pulled out from the reels 81*a*, 81*b*, and 81*c*.

The tapes 83*a*, 83*b*, and 83*c* wound around the drum 82 are pulled out from the drum 82. The tapes 83*a*, 83*b*, and 83*c* pulled out from the drum 82 are wound by the reels 81*a*, 81*b*, and 81*c*.

Figure 8:
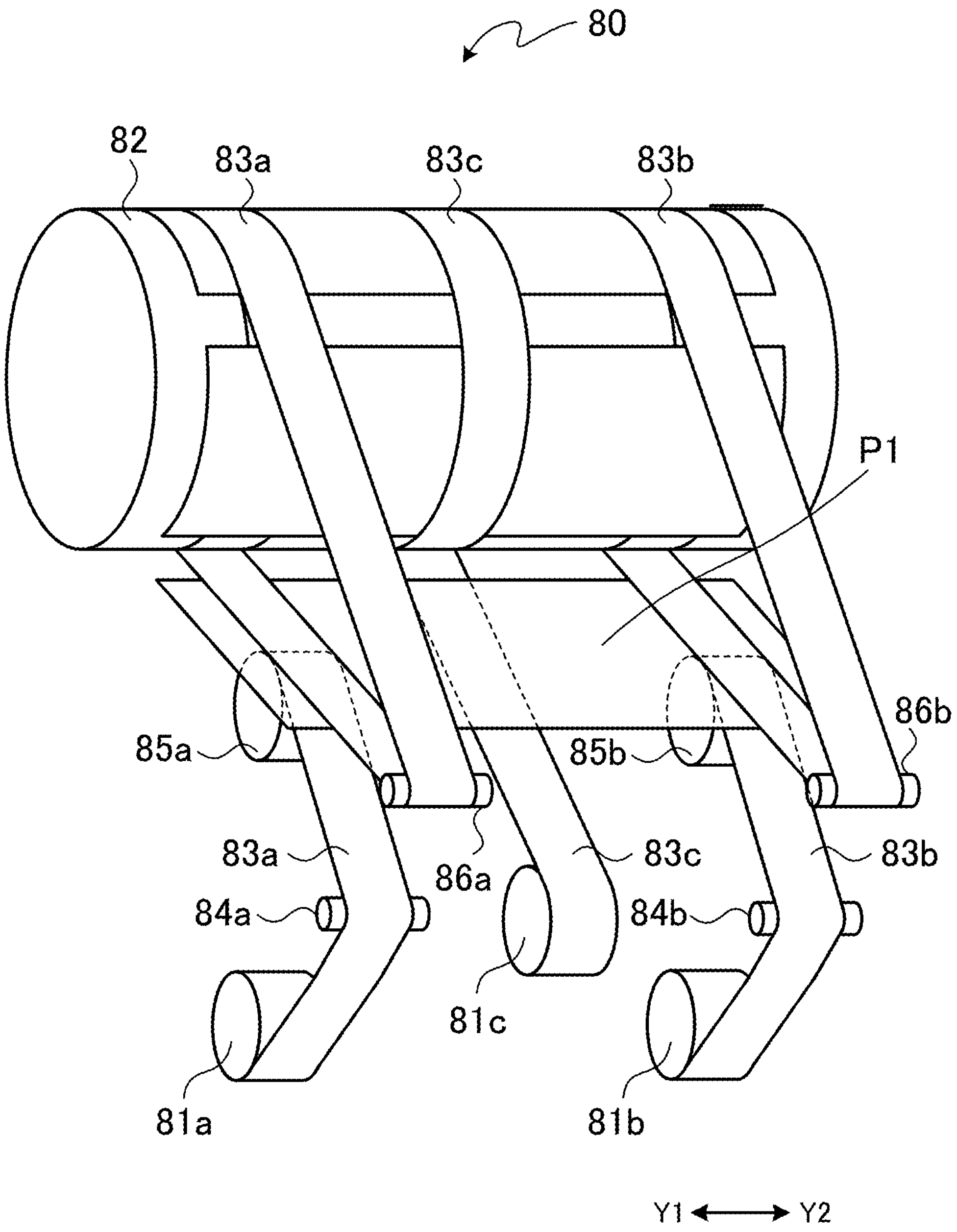
FIG. 8 is a perspective view of a sheet storage according to Embodiment 3.
Figure 9:
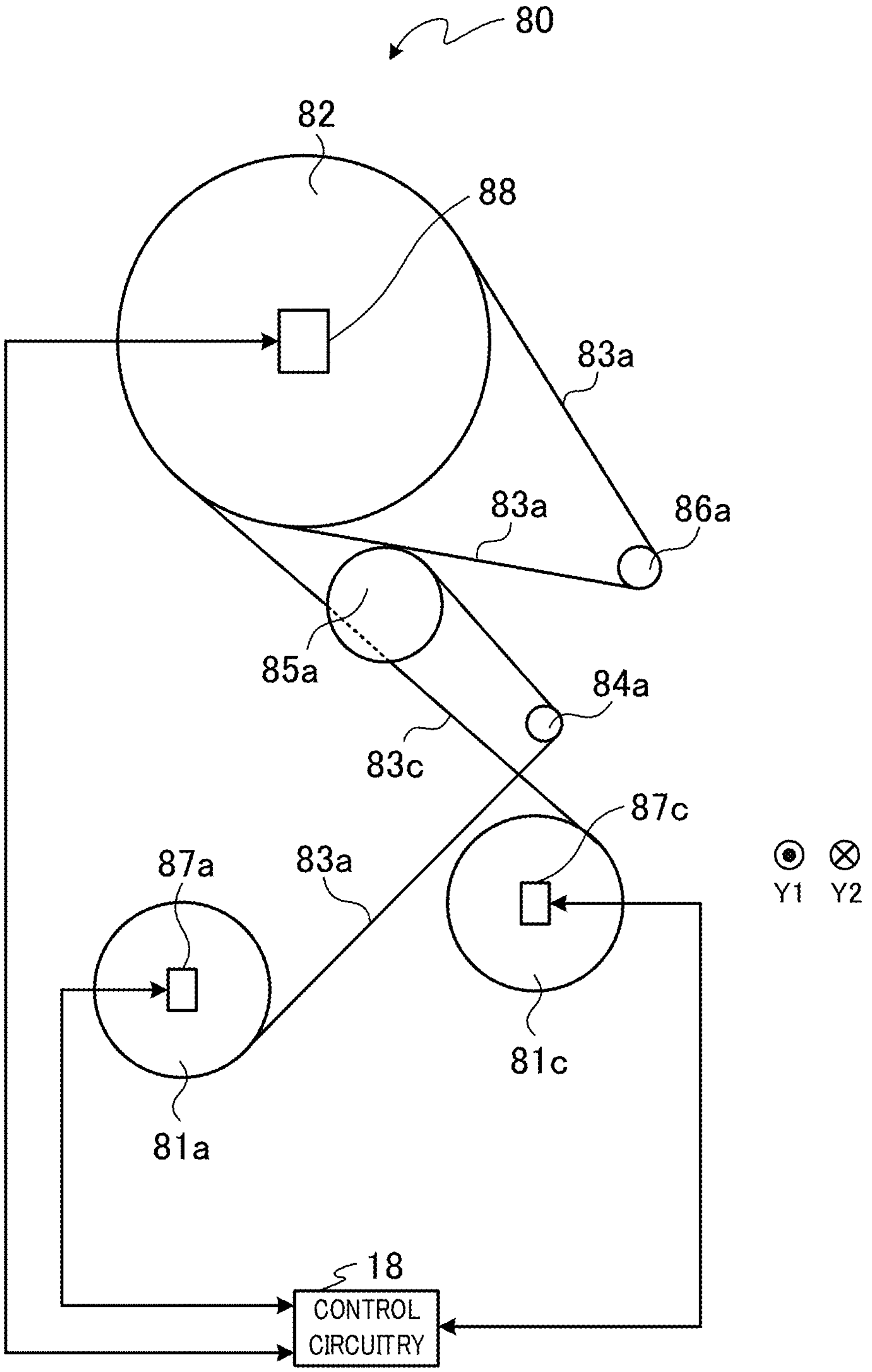
FIG. 9 is a side view of the sheet storage according to Embodiment 3.

A sheet transported to the sheet storage 80 is inserted, as indicated by the sheet P1 in FIG. 8, between the tapes 83*a* that are faced in parallel by the rollers 85*a* and 86*a*. The sheet transported to the sheet storage 80 is also inserted, as indicated by the sheet P1 in FIG. 8, between the tapes 83*b* that are faced in parallel by the rollers 85*b* and 86*b*. The sheet transported to the sheet storage 80 is also inserted, as indicated by the sheet P1 in FIG. 8, between the tape 83*c* pulled out from the reel 81*c* and the outermost tape 83*c* wound around the drum 82. The sheet transported to the sheet storage 80 is wound around the drum 82 together with the tapes 83*a*, 83*b*, and 83*c* by the rotation of the drum 82. For example, the sheet is wound around the drum 82 together with the tapes 83$a$, 83$b$, and 83$c$ by the clockwise rotation of the drum 82 when viewed toward the direction Y2.

The sheet wound around the drum 82 together with the tapes 83$a$, 83$b$, and 83$c$ is released from the drum 82 by the rotation of the drum 82, and fed out to the transport path connected to the sheet storage 80. For example, the sheet wound around the drum 82 together with the tapes 83$a$, 83$b$, and 83$c$ is released from the drum 82 by the counterclockwise rotation of the drum 82 when viewed toward the direction Y2, and fed out to the transport path connected to the sheet storage 80.

The drive unit 87$a$ rotates the reel 81$a$ clockwise or counterclockwise around the rotation axis viewed from the extending direction of the rotation axis.

The drive unit (not illustrated in FIGS. 8 and 9) to rotate the reel 81$b$ rotates the reel 81$b$ clockwise or counterclockwise around the rotation axis viewed from the extending direction of the rotation axis.

The drive unit 87$c$ rotates the reel 81$c$ clockwise or counterclockwise around the rotation axis viewed from the extending direction of the rotation axis. The drive units 87$a$ and 87$c$ and the drive unit to rotate the reel 81$b$ may be, for example, stepper motors.

In the following, the drive unit 87$a$ to rotate the reel 81$a$, the drive unit (not illustrated) to rotate the reel 81$b$, and the drive unit 87$c$ to rotate the reel 81$c$ may be collectively referred to as the first drive unit.

In the following, the rotation direction in which the tapes 83$a$, 83$b$, and 83$c$ of the reels 81$a$, 81$b$, and 81$c$ are pulled out is sometimes called a pulling out direction. In addition, the rotation direction in which the tapes 83$a$, 83$b$, and 83$c$ of the reels 81$a$, 81$b$, and 81$c$ are wound is sometimes called a winding direction.

The drive unit 88 rotates the drum 82 clockwise or counterclockwise around the rotation axis viewed from the extending direction of the rotation axis. The drive unit 88 may be, for example, a stepper motor.

In the following, the drive unit 88 to rotate the drum 82 may be referred to as the second drive unit.

In the following, the rotation direction in which the tapes 83$a$, 83$b$, and 83$c$ of the drum 82 are wound is sometimes called a winding direction. For example, the clockwise rotation direction of the drum 82 when viewed toward the direction Y2 is sometimes called the winding direction. In addition, the rotation direction in which the tapes 83$a$, 83$b$, and 83$c$ of the drum 82 are pulled out is sometimes called a pulling out direction. For example, the counterclockwise rotation direction of the drum 82 when viewed toward the direction Y2 is sometimes called the pulling out direction.

The control circuitry 18 controls at least one of the first drive unit and the second drive unit to change the tension of the tapes 83$a$, 83$b$, and 83$c$ according to the state of the sheet storage 80. For example, the control circuitry 18 changes the tension of the tapes 83$a$, 83$b$, and 83$c$ according to the state of the sheet storage 80 as illustrated in FIG. 5.

The control circuitry 18 controls the first drive unit to rotate the reels 81$a$, 81$b$, and 81$c$ in the pulling out direction or the winding direction. The control circuitry 18 also controls the second drive unit to rotate the drum 82 in the winding direction or the pulling out direction.

For example, when controlling the first drive unit to rotate the reels 81$a$, 81$b$, and 81$c$ in the pulling out direction, the control circuitry 18 controls the second drive unit and rotates the drum 82 in the winding direction. When controlling the first drive unit to rotate the reels 81$a$, 81$b$, and 81$c$ in the winding direction, the control circuitry 18 controls the second drive unit and rotates the drum 82 in the pulling out direction.

The control circuitry 18 controls at least one of the first drive unit and the second drive unit to change the tension of the tapes 83$a$, 83$b$, and 83$c$ according to the state of the sheet storage 80.

For example, the control circuitry 18 may control the moving velocity of the tapes 83$a$, 83$b$, and 83$c$ using one(s) to be rotated in the winding direction among the reels 81$a$, 81$b$, and 81$c$ and the drum 82. The control circuitry 18 may control the tension of the tapes 83$a$, 83$b$, and 83$c$ using one(s) to be rotated in the pulling out direction among the reels 81$a$, 81$b$, and 81$c$ and the drum 82.

To be more specific, the control circuitry 18 rotates the reels 81$a$, 81$b$, and 81$c$ in the pulling out direction, and rotates the drum 82 in the winding direction. In this case, the control circuitry 18 controls the rotation velocity of the drum 82 by the second drive unit, and determines the moving velocity of the tapes 83$a$, 83$b$, and 83$c$, for example. The control circuitry 18 controls the torque of the reels 81$a$, 81$b$, and 81$c$ by the first drive unit, and determines the tension of the tapes 83$a$, 83$b$, and 83$c$, for example.

Further, the control circuitry 18 rotates the reels 81$a$, 81$b$, and 81$c$ in the winding direction, and rotates the drum 82 in the pulling out direction, for example. In this case, the control circuitry 18 controls the rotation velocity of the reels 81$a$, 81$b$, and 81$c$ by the first drive unit, and determines the moving velocity of the tapes 83$a$, 83$b$, and 83$c$, for example.

The control circuitry 18 controls the torque of the drum 82 by the second drive unit, and determines the tension of the tapes 83$a$, 83$b$, and 83$c$, for example.

Note that the control circuitry 18 may control the rotation velocity and torque of the first drive unit and the second drive unit using PWM, for example.

Further, the control circuitry 18 may control the moving velocity of the tapes 83$a$, 83$b$, and 83$c$ using one(s) to be rotated in the pulling out direction among the reels 81$a$, 81$b$, and 81$c$ and the drum 82. The control circuitry 18 may control the tension of the tapes 83$a$, 83$b$, and 83$c$ using one(s) to be rotated in the winding direction among the reels 81$a$, 81$b$, and 81$c$ and the drum 82.

The control circuitry 18 changes the tension of the tapes 83$a$, 83$b$, and 83$c$ not only by controlling either the first drive unit or the second drive unit according to the state of the sheet storage 80. The control circuitry 18 may change the tension of the tapes 83$a$, 83$b$, and 83$c$ by controlling either the first drive unit or the second drive unit according to the state of the sheet storage 80.

Note that the layout of the tapes 83$a$, 83$b$, and 83$c$ may be changed in Embodiment 3. The above description is based on the layout in which the side tape 83$a$ (83$b$) is wound around the drum 82 via the roller 84$a$ (84$b$) and the middle tape 83$c$ is wound around the drum 82 without a transit roller such as the roller 84$a$. Such a layout is changeable. For example, it may be a layout in which the middle tape 83$c$ is wound around the drum 82 via a transit roller and the side tape 83$a$ (83$b$) is wound around the drum 82 without a transit roller such as the roller 84$a$ (84$b$).

Further, the drum 82 may be configured to include three parts each comprising a drive unit in Embodiment 3. In this case, the control circuitry 18 controls the drive units respectively provided in the three reels and the drive units respectively provided in the three parts of the drum 82. That is, the control circuitry 18 controls six drive units. The tape 83$a$ is moved by two drive units, the tape 83$b$ is moved by other two drive units, and the tape 83$c$ is moved by the other two drive units. This enables individual control of the tension of the three tapes 83$a$, 83$b$, and 83$c$, thereby appropriately adjusting the tension acting on each tape.

As described above, the sheet storage 80 may store sheets using the three tapes 83*a*, 83*b*, and 83*c*. Even in the case of using the three tapes 83*a*, 83*b*, and 83*c*, the sheet storage 80 can still control the tension of the tapes 83*a*, 83*b*, and 83*c*, and improve the performance.

Note that the sheet storages 40, 60, and 80 described in the above Embodiments 1 to 3 are merely examples of the invention. Thus, the configuration may be appropriately changed as long as a reel and a drum are connected via a tape and the tension acting on the tape can be adjusted by controlling a drive unit that drives the reel and a drive unit that drives the drum. That is, the present disclosure is applicable to not only the above Embodiments 1 to 3 but also any configuration of controlling at least one of a drive unit that drives a unit feeding out a tape and a drive unit that drives a unit winding the tape.

The configuration may be thus changed as follows. For example, the sheet storage may use one tape, or five or more tapes. Further, various layouts can be adopted for the tapes used in the sheet storage. Furthermore, the number of drive units are changed according to the number of reels to be provided. Thus, the number of drive units controlled by a control circuitry to adjust the tension acting on a tape is changed according to the number of drive units to be provided, and may be five or more.

REFERENCE SIGNS LIST

1 Sheet processing apparatus
4 Detachable storage unit
5 Attaching unit
10 Upper housing
12 Inlet
13 Outlet
14 Second outlet
15 Transport unit
15*a* Loop transport path
15*b* First divergent path
15*c* Second divergent path
15*d* Third divergent path
15*e* Fourth divergent path
15*f* Fifth divergent path
15*g* Sixth divergent path
16 Recognition unit
17 Memory
18 Control circuitry
19 Temporary storage unit
20 Lower housing
21 First storage
22 Storage door
23 First storage unit
24 Second storage unit
25 Third storage unit
26 Fourth storage unit
27 Fifth storage unit
28 Sixth storage unit
30 Second storage
33 Collection unit
40, 60, 80 Sheet storage
41, 61*a*, 61*b*, 81*a*, 81*b*, 81*c* Reel
42, 62, 82 Drum
43*a*, 43*b*, 63*a*, 63*b*, 64*a*, 64*b*, 83*a*, 83*b*, 83*c* Tape
44, 45, 67*a*, 67*b*, 68, 87*a*, 87*c*, 88 Drive unit
48 Velocity detection unit
65*a*, 65*b*, 66*a*, 66*b*, 84*a*, 84*b*, 85*a*, 85*b*, 86*a*, 86*b* Roller

The invention claimed is:

1. A sheet storage that stores a sheet, the sheet storage comprising:
a reel around which a tape is wound;
a first drive unit that rotates the reel around a rotation axis;
a drum that is connected to the reel via the tape and winds the tape wound around the reel together with the sheet;
a second drive unit that rotates the drum around a rotation axis; and
a control circuitry that controls at least one of the first drive unit and/or the second drive unit to change tension acting on the tape according to a state of the sheet storage and according to at least one of a quantity and/or a type of the sheet wound around the drum.

2. The sheet storage according to claim 1, wherein the control circuitry changes the tension acting on the tape based on a number of the sheets wound around the drum, the number of the sheets corresponding to the quantity of the sheets, or changes the tension acting on the tape based on a distance between the rotation axis of the drum and any point of an outermost circumference of the tape wound around the drum together with the sheets, the distance corresponding to the quantity of the sheets.

3. The sheet storage according to claim 1, wherein
the control circuitry changes the tension acting on the tape based on information including at least one of a currency, a denomination, a direction, and/or fitness, and
the information corresponds to the type of the sheet.

4. The sheet storage according to claim 1, wherein in a case that a quantity of the sheets wound around the drum changes from a first quantity to a second quantity, the second quantity being a quantity increased from the first quantity, the control circuitry controls the at least one of the first drive unit and/or the second drive unit to set the tension acting on the tape for the second quantity lower than the tension acting on the tape for the first quantity.

5. The sheet storage according to claim 1, wherein in a case that acceleration of the tape fed from the reel is not zero, the control circuitry controls the at least one of the first drive unit and/or the second drive unit to change the tension acting on the tape.

6. The sheet storage according to claim 5, wherein the control circuitry:
controls, in a case that the tape fed from the reel is accelerated, the at least one of the first drive unit and/or the second drive unit to set the tension acting on the tape lower than the tension when the acceleration of the tape is zero, and
controls, in a case that the tape fed from the reel is decelerated, the at least one of the first drive unit and/or the second drive unit to set the tension acting on the tape higher than the tension when the acceleration of the tape is zero.

7. The sheet storage according to claim 1, wherein
the sheet storage is provided in a sheet processing apparatus, and
the control circuitry controls the at least one of the first drive unit and/or the second drive unit to change the tension acting on the tape according to power consumption of the sheet processing apparatus.

8. The sheet storage according to claim 1, further comprising:
a first sheet storage including the first drive unit and the second drive unit; and
a second sheet storage, wherein
the control circuitry controls the at least one of the first drive unit and/or the second drive unit to change the tension acting on the tape of the first sheet storage according to states of the first sheet storage and the second sheet storage.

9. The sheet storage according to claim 1, wherein the control circuitry controls either the first drive unit or the second drive unit to change the tension acting on the tape according to a state of the sheet storage.

10. The sheet storage according to claim 1, wherein the control circuitry controls both the first drive unit and the second drive unit to change the tension acting on the tape according to a state of the sheet storage.

11. The sheet storage according to claim 1, wherein the first drive unit and the second drive unit are stepper motors.

12. The sheet storage according to claim 1, wherein the control circuitry controls the at least one of the first drive unit and/or the second drive unit to gradually change the tension acting on the tape according to a state of the sheet storage.

13. The sheet storage according to claim 1, wherein the control circuitry controls, based on a state of the sheet storage, the at least one of the first drive unit and/or the second drive unit to change the tension acting on the tape, the tension appropriately corresponding to a state of the sheet storage.

14. The sheet storage according to claim 1, wherein the control circuitry controls the at least one of the first drive unit and/or the second drive unit to set the tension acting on the tape higher than a normal tension or to set the tension acting on the tape lower than the normal tension, according to a state of the sheet storage, the normal tension serving as a reference value.

* * * * *